(12) United States Patent
Hagmeier et al.

(10) Patent No.: US 6,971,014 B1
(45) Date of Patent: Nov. 29, 2005

(54) DEVICE AND METHOD FOR ADMINISTRATION OF IDENTIFYING CHARACTERISTICS

(75) Inventors: Joachim Hagmeier, Stuttgart (DE); Michael Kaisser, Holzgerlingen (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/459,290

(22) Filed: Dec. 17, 1999

(30) Foreign Application Priority Data

Jan. 16, 1999 (DE) ................................ 199 01 523

(51) Int. Cl.[7] ................................................ H04L 9/32
(52) U.S. Cl. ...................... 713/182; 713/183; 713/186; 713/202
(58) Field of Search ........................ 395/188; 713/182, 713/183, 185, 186, 202

(56) References Cited

U.S. PATENT DOCUMENTS 6,643,784 B1 * 11/2003 McCulligh .................. 713/202

FOREIGN PATENT DOCUMENTS

JP          10222731 A  *  8/1998  ............. G07F 7/02

OTHER PUBLICATIONS

O. Kimura, JP 10-222731 A, "Fingerprint Verifying Type Automatic Vending Machine System," Aug. 21, 1998, Japan Patent Office, Computer Translation into English. Retrieved from the Internet:<URL: http://www.ipdl.jpo.go.jp/homepg_e.ipdl>.*

* cited by examiner

Primary Examiner—Justin T. Darrow
(74) Attorney, Agent, or Firm—William A. Kinnaman, Jr.

(57) ABSTRACT

The invention relates to a device and a method for administering, in particular for creating and changing, identifying characteristics. During input of the new identifying characteristic by a user a check of the identifying characteristic is performed. Depending on the result of the check, a facility for termination of input of the new identifying characteristic is activated or deactivated as appropriate. The present invention substantially improves user-friendliness in the creation and changing of identifying characteristics, as failed attempts to input the new identifying characteristics are avoided.

10 Claims, 6 Drawing Sheets

DEVICE AND METHOD FOR ADMINISTRATION OF IDENTIFYING CHARACTERISTICS

BACKGROUND OF THE INVENTION

1. Field of the Invention

The invention relates to a device and a method for administration of identifying characteristics. The invention relates in particular to a device and a method for creating and/or changing identifying characteristics.

2. Description of the Related Art

In order to control the access of people to systems such as personal computers, computer networks, buildings, rooms, and the like, identifying characteristics such as passwords, PIN numbers, biometric features or voice identifiers are frequently applied by means of the people concerned entering the identifying characteristic into the control device for identification purposes in order to gain access to a system (computer system, building access control system, etc.). As well as new identifying characteristics being created for each new user of the system, the identifying characteristics must also be changed from time to time for security reasons. Methods of creating and changing identifying characteristics are known. In those methods the user has the possibility of terminating his input at any time throughout the duration of input. The new identifying characteristic entered is only checked when the input is terminated by the user. The new identifying characteristic is also frequently entered twice, in order to avoid unintentional incorrect input or biometric recognition errors, referred to collectively in the following as input errors. Here, too, the identifying characteristics are only checked when both identifying characteristics have been entered and the input is terminated by the user. If the new identifying characteristic does not meet certain pre-defined criteria, the attempted access fails. Likewise, input errors—that is to say, unintentional or technically based differences between the newly created identifying characteristic and its repetition—also result in failure. These failures generally produce error messages. They may additionally result in the user's access rights being barred. This represents a severe restriction of user-friendliness in the creation and changing of identifying characteristics.

SUMMARY OF THE INVENTION

The object of the invention is to increase user-friendliness in the creation and changing of identifying characteristics.

The object of the invention is fulfilled by the independent claims.

The invention is based on the concept of performing a check of the new identifying characteristic during its input, and only passing the identifying characteristic to a device to process the identifying characteristic when all check criteria are met.

The present invention substantially improves user-friendliness in administering, and most particularly in the creation and changing of, identifying characteristics, as failed attempts to input the new identifying characteristic are avoided. This relates both to failed attempts due to input of an identifying characteristic which does not meet specific criteria, and to failed attempts which may result from an input error in a possible second input operation of the identifying characteristic. The invention can be applied to all kinds of identifying characteristics, in particular to passwords, PIN numbers, biometric features (fingerprint scan, face scan, eye scan, etc.), voice characteristics, and the like.

Through the elimination of input failures and the associated system actions such as error messages, bars or cancellation of user access rights, the creation and changing of identifying characteristics is made easier, quicker and more secure. The invention is described in more detail in the following on the basis of examples.

DESCRIPTION OF THE PREFERRED EMBODIMENTS

For simplification purposes, the invention is described in the following based only on the example of editing of a password. The invention is not restricted to password editing, however. It can equally be used to create new passwords and to change and create any other identifying characteristics.

An embodiment of the invention can be implemented in any desired computer system environment, with any desired hardware or with any desired combination of hardware and software. The invention is detailed in the following based on the example of editing of a password for a personal computer.

Figure 1:
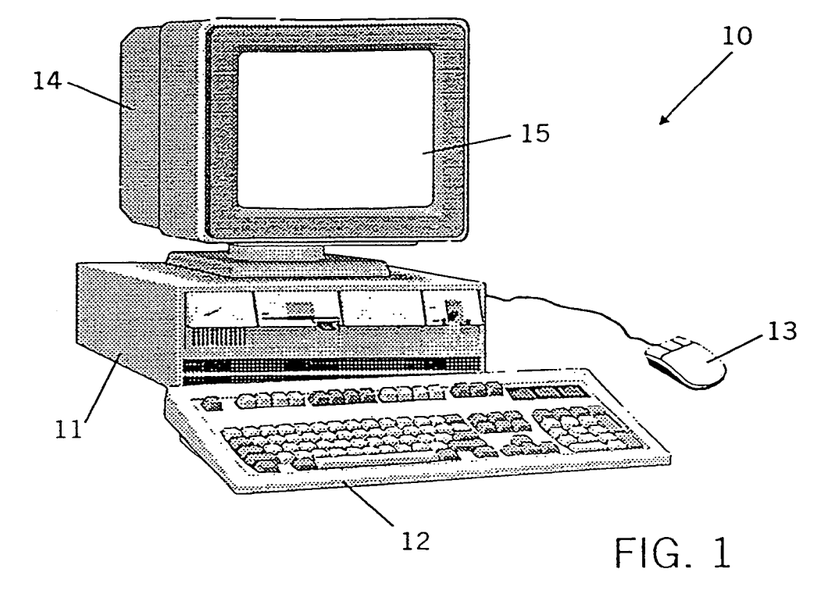
FIG. 1 shows a personal computer, comprising a system unit, keyboard, mouse and monitor, for use with a preferred embodiment of the invention.

FIG. 1 shows a personal computer 10 of the kind for implementation of the invention, comprising a system unit 11, a keyboard 12, a mouse 13 and a monitor 14. The screen 15 of the monitor 14 is used to present a graphical user interface. The graphical user interface is supported by the operating system of the personal computer 10, so that a user is able to utilize the keyboard 12 and mouse 13 to enter data—such as passwords—in the personal computer or execute user actions. The personal computer 10 further contains at least one processor to process information, and a memory in which data can be stored. The operating system used may be IBM OS/2 for example.

The process of a preferred embodiment of the invention is described on the basis of flowcharts in FIGS. 3a to 3e.

The personal computer 10 has a password editing facility to edit the password. The password editing facility may be written as a data processing (software) program. In this case, the program is executed when started in the processor of the personal computer 10. The password editing facility may, however, also be implemented in hardware form, for example hard-wired in the personal computer 10.

Figure 2:
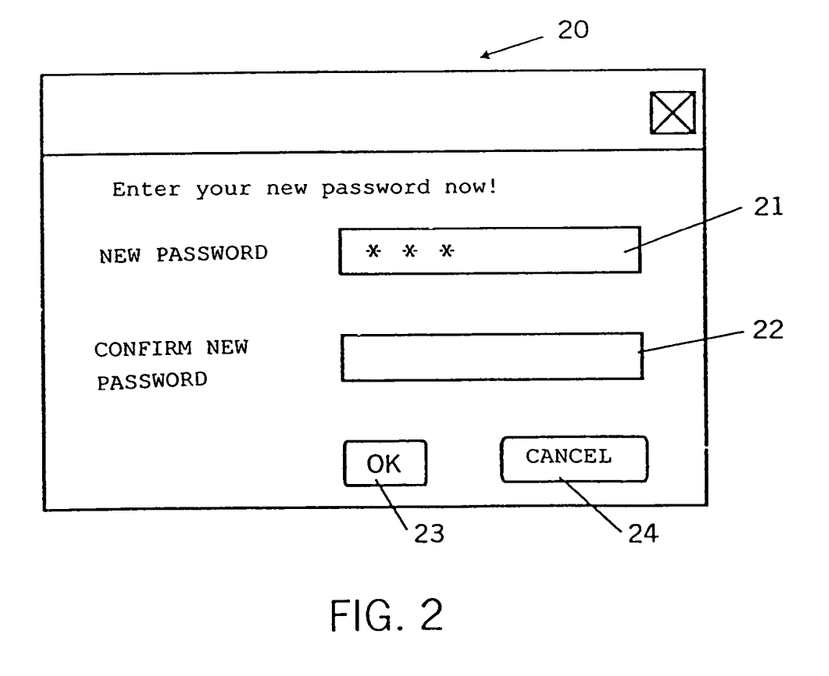
FIG. 2 shows an input screen in the form of a graphical user interface for the editing of passwords, for use with a preferred embodiment of the invention.
Figure 3A:
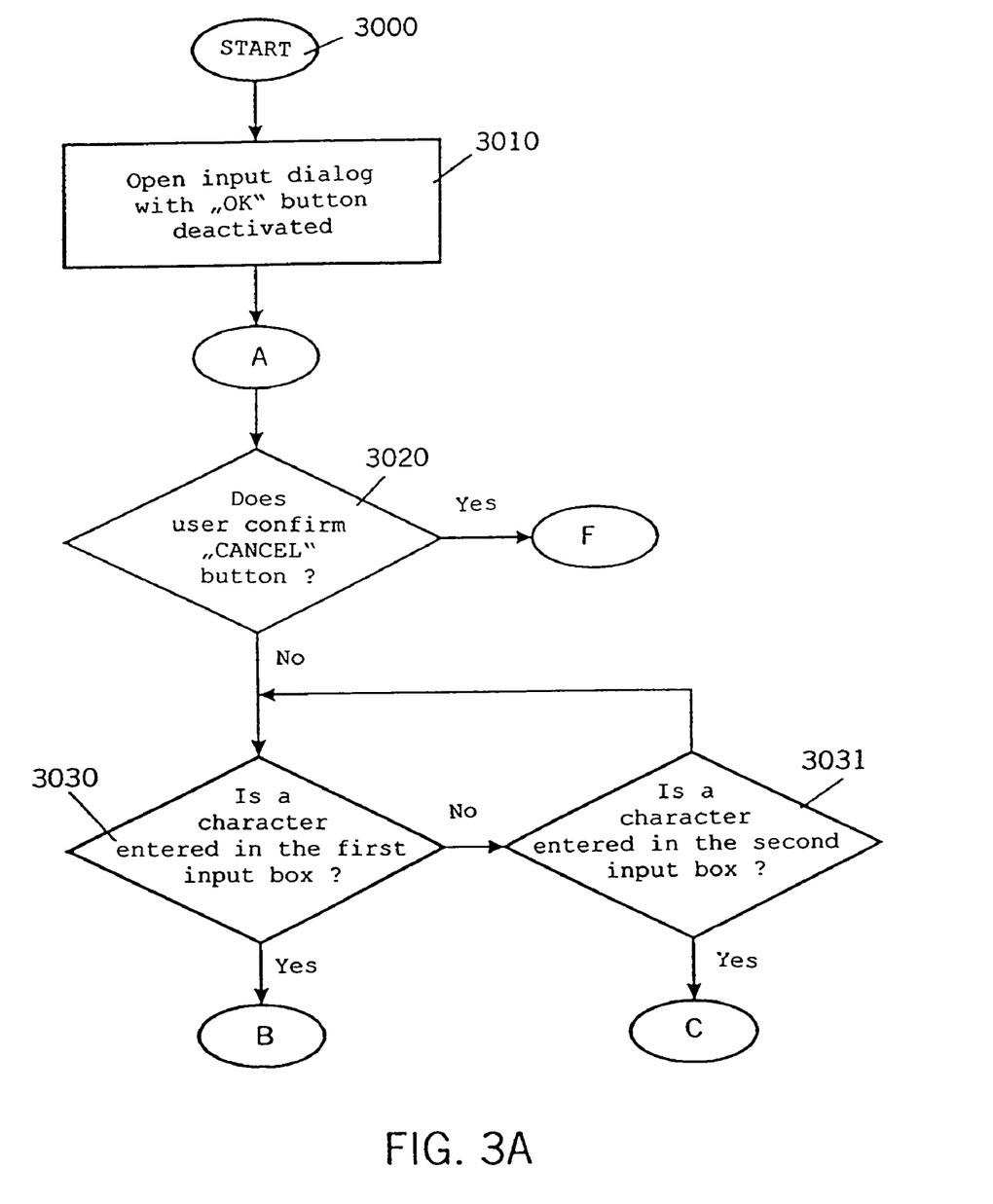
FIGS. 3a to 3e show flowcharts representing the process of a preferred embodiment of the invention.

As shown in FIG. 3a, the user starts a password editing program in accordance with the invention in a first step 3000. The program presents to the user an input screen 20 in the form of a graphical user interface, which appears on the screen 15 in a step 3010. An example of an input screen 20 of this kind is shown in FIG. 2.

The input screen 20 contains a first input box 21 for input of the new password and a second input box 22 for repeat input of the new password. It also provides a facility for terminating input, here in the form of an "OK" button 23, as well as a facility to abort input, here in the form of a "Cancel" button 24.

When the input screen 20 appears on the screen 15 the "OK" button cannot be selected. The button is then displayed such that the user can see that it cannot be selected. This is usually effected by shading of the button.

Figure 3B:
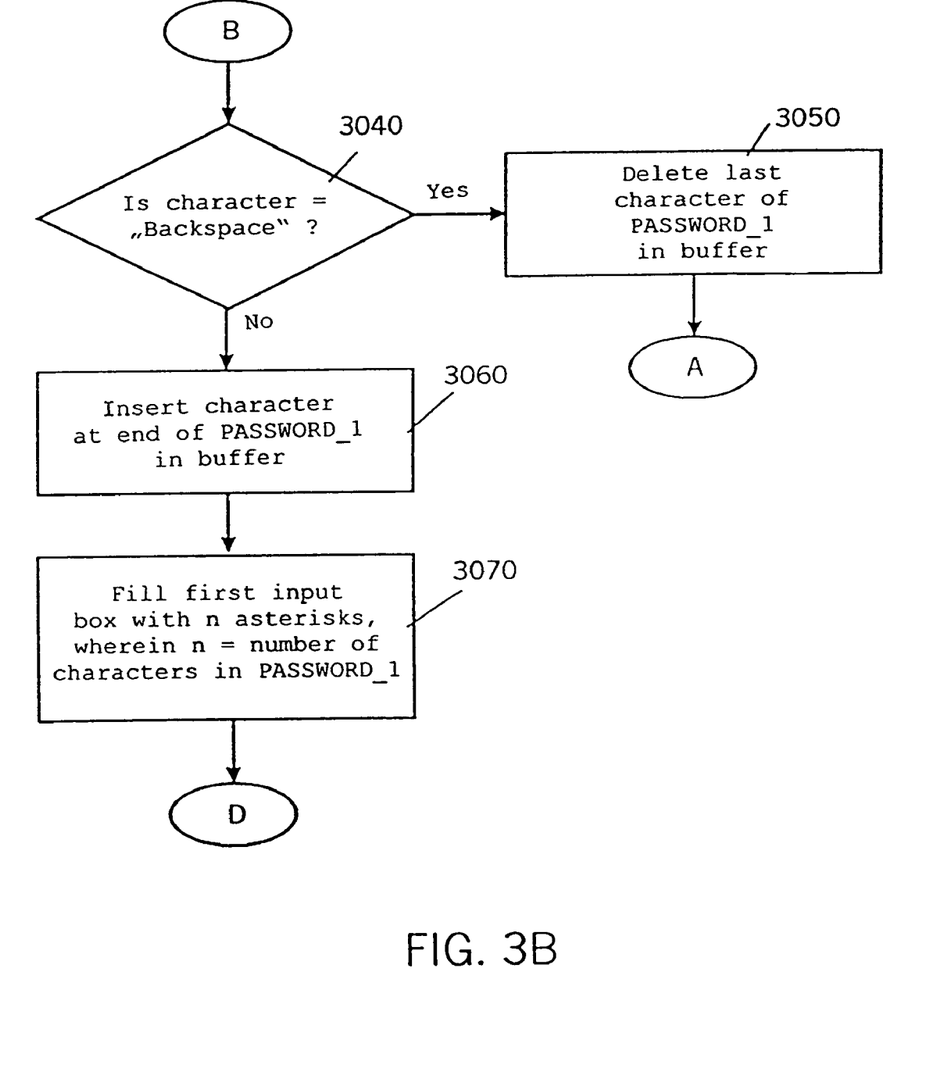
Figure 3C:
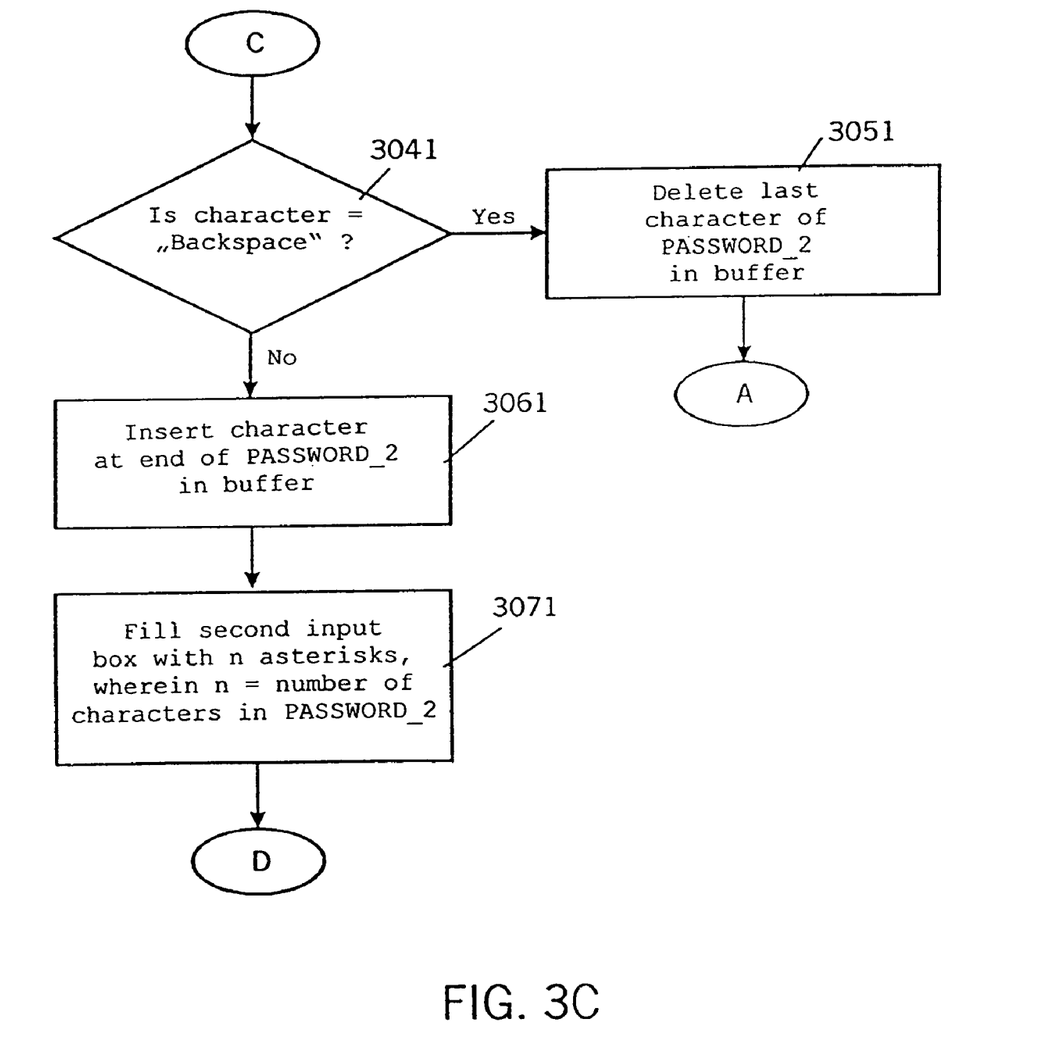

The password editing program checks in step 3020 whether the user presses the "Cancel" button 24. If so, the input screen is closed, as shown in FIG. 3e, step 3160, and the password editing process is terminated with step 3170.

If the "Cancel" button 24 is not pressed, the password editing program checks in step 3030 whether a character is entered in the first input box 21 of the input screen 20.

If the input screen 20 is active, every keypress is transmitted by the operating system to the password editing program. For this, the password editing program is logged with the operating system as the responsible handler routine. If the user then enters a character in the first input box using the keyboard 12, the entered character is stored in step 3060, as shown in FIG. 3b, under the name PASSWORD_1 in a buffer memory on the personal computer 10, or the character is suffixed to an existing PASSWORD_1. Prior to this, the password editing program checks in step 3040 whether the last keypress by the user was on the "Backspace" key. If so, in step 3050 the last character of PASSWORD_1 is deleted from the buffer, and the program waits for another character to be entered.

Then, in step 3070, the entered character is entered by the operating system of the computer into the first input box 21 of the input screen 20. Preferentially, only a placeholder character, such as the character "*", is entered, so that the password is illegible on the screen 15.

Then the entered character is passed by the operating system of the personal computer 10 to a device for checking of the password (checker device).

The device for checking of the password checks each individual new character entered by the user to determine whether the password comprising the entered characters meets certain check criteria, in the following termed criteria. This check is preferentially performed during input of the password.

Criteria for new passwords may, for example, be: minimum length and/or maximum length of the password, specifications of which characters a password must contain, specifications of which characters a password must not contain, matching of the new password to a previous password of the user, matching of the new password to passwords of other users, and the like.

In general, the criteria are dependent on the respective system (computer system, building access control system), and so can be selected at will. Since the invention is not restricted to passwords, but, for example, is also applicable to biometric identifying characteristics (fingerprint, face scan, eye scan, etc.), one criterion may, for example, also be the completeness of the scanned information (e.g. presence of a specified minimum number of nodes on fingerprints).

In the present example, the new password is to comprise five characters—three letters and two digits. And the first character of the password must be a letter. A further criterion is matching of the repeated input of the new password in the second input box (PASSWORD_2) to the password entered in the first input box (PASSWORD_1).

In an embodiment of the invention, the device for checking the password is a component element of the password editing program and the criteria to be checked are contained in the program code of the password editing program.

Figure 3D:
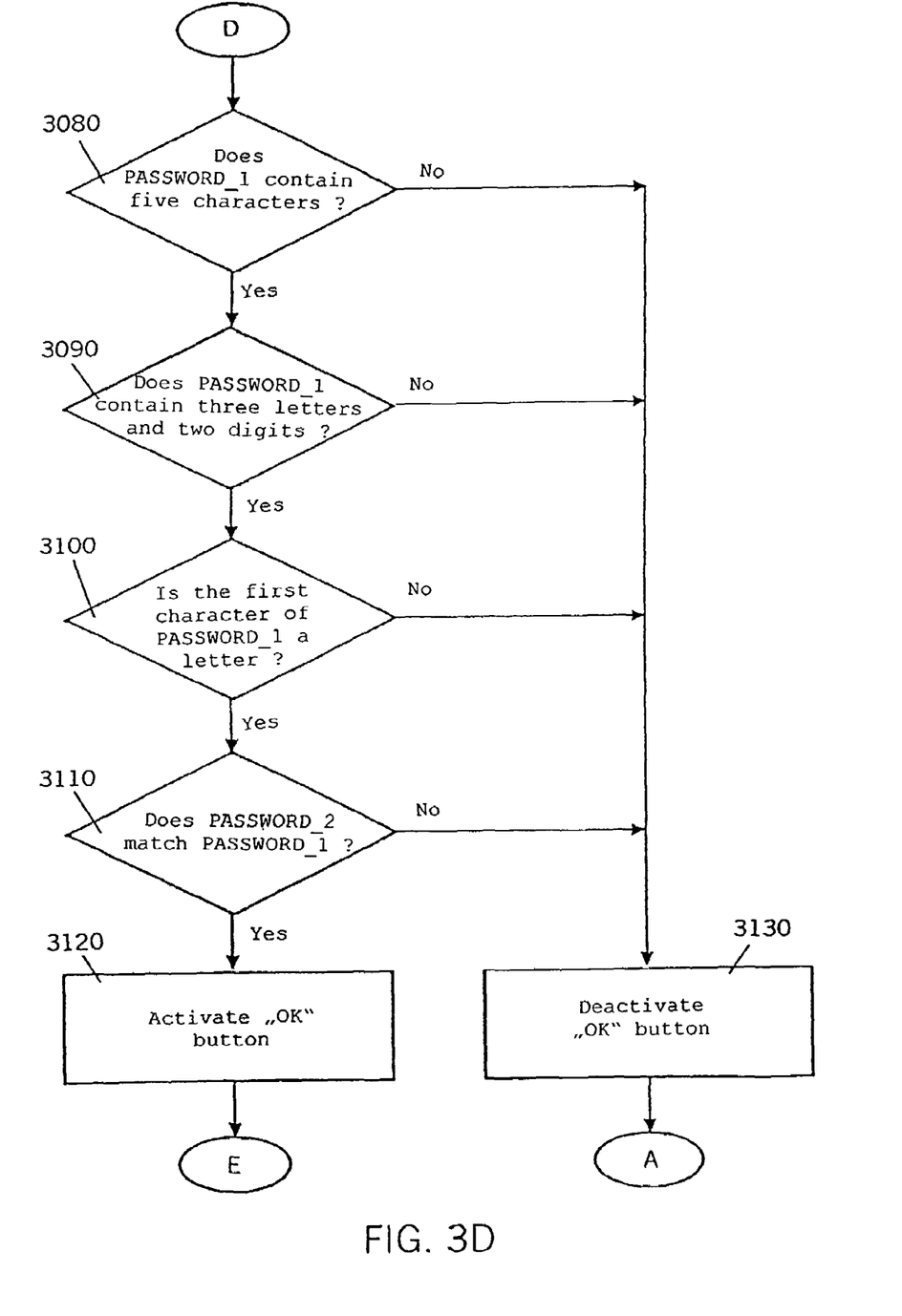
Figure 3E:
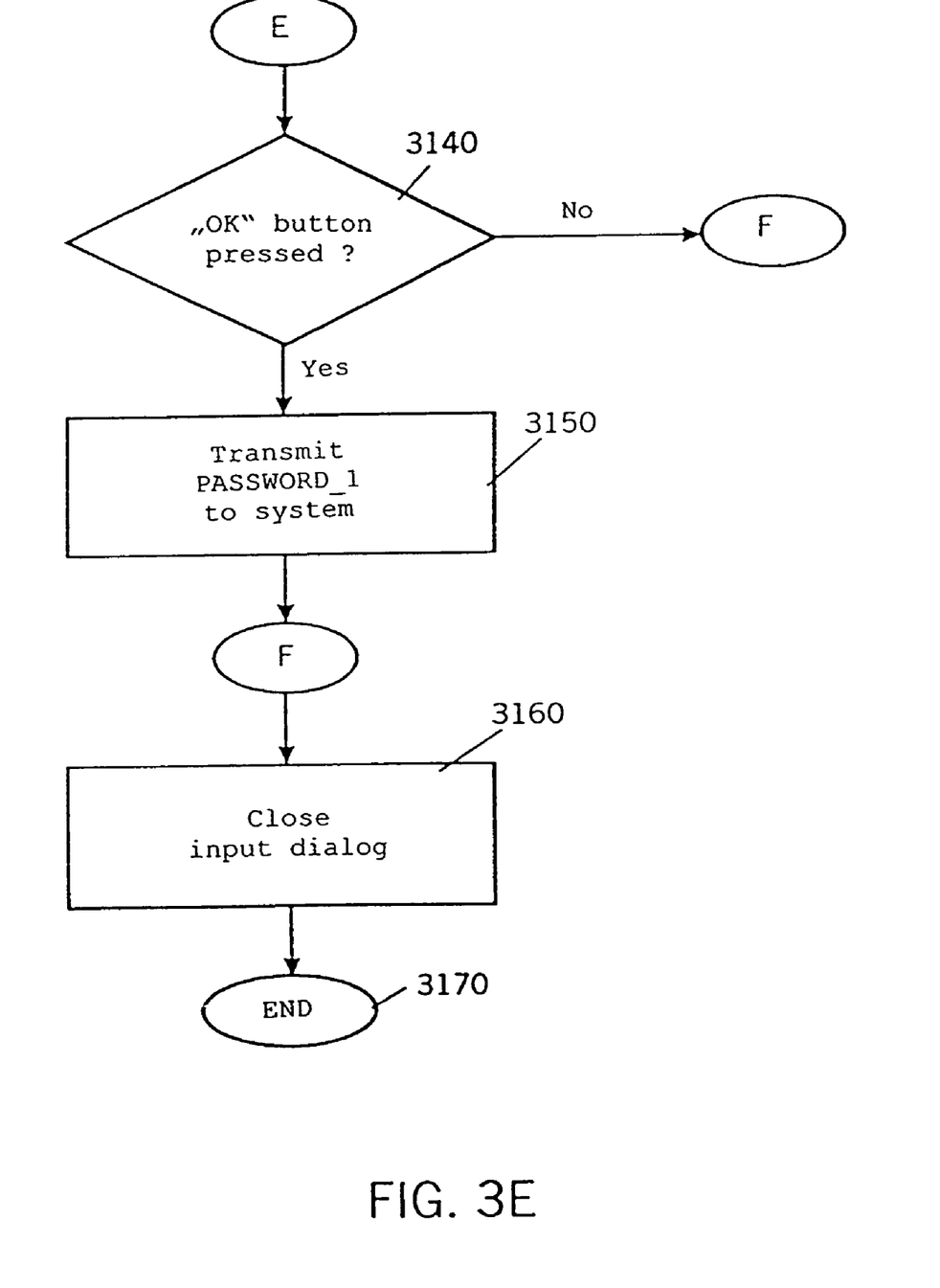

As shown in FIG. 3d, the password editing program checks in succession all the criteria defined for this example. First, in step 3080, a check is made as to whether the PASSWORD_1 stored in the buffer contains five characters. If it does not, the password editing program in step 3130 sends a signal to the "OK" button 23 to deactivate the button 23 by way of the relevant operating system interface. The user is then unable to terminate the input made in the input screen 20.

If the first criterion is met, the password editing program in step 3090 checks the next criterion, namely: whether the PASSWORD_1 contains three letters and two digits. If that criterion is not met, the "OK" button 23 is again deactivated in step 3130. If the criterion is met, in steps 3100 and 3110 the further criteria are checked in succession, wherein, in case of one of the specified criteria not being met, the check of the newly entered character is in each case terminated with deactivation of the "OK" button 23.

If step 3030 (FIG. 3a) establishes that no character is entered in the first input box 21, in step 3031 a check is made as to whether a character is entered in the second input box 22 of the input screen 20. If so, as in FIG. 3c described, the same procedure is followed as in steps 3040, 3050, 3060 and 3070. In this, in step 3061 the entered character is stored under the name PASSWORD_2 in the buffer memory on the personal computer 10, or the entered character is suffixed to an existing PASSWORD_2. Prior to this, the password editing program checks in step 3041 whether the last keypress by the user was on the "Backspace" key. If so, in step 3051 the last character of PASSWORD_2 is deleted from the buffer.

Then, in step 3071, the entered character is entered by the operating system of the computer into the second input box 22 of the input screen 20. Preferentially, only a placeholder character, such as the character "*", is entered, so that the password is illegible on the screen 15. As on input of a character in the first input box 21, on input of a character in the second input box 22, too, the entered character is then passed by the operating system of the personal computer 10 to the device for checking of the password, which checks whether the password comprising the entered characters meets certain criteria. As described above, this check is performed in the present example by the password editing program beginning with step 3080, FIG. 3d. If one of the specified criteria is not met, the check of the entered character is terminated with step 3130, deactivation of the "OK" button 23 in the input screen 20.

After deactivation of the "OK" button 23 in step 3130, the process resumes with steps 3020, 3030, and so forth (FIG. 3)—that is, the password editing program waits for more input by the user.

After each input of a new character the process steps described above are run through and the password editing program checks whether the specified criteria are met. As long as this is not the case, in step 3130 the signal to deactivate the "OK" button 23 is transmitted, and the user is unable to terminate the input made in the input screen 20, and thus the password change, by selecting the "OK" button 23.

If the check of the criteria establishes that all criteria are met, the check of the entered characters is terminated with step 3120 (FIG. 3d).

Since all criteria are met, the user is given the possibility to terminate input of the password. To this end, the password editing program transmits an activation signal via the relevant operating system interface to the "OK" button 23 in the input screen 20. After activation of the "OK" button 23, it is then displayed such that the user can see that it is no longer deactivated. The usual shading of the button is canceled.

The "OK" button 23, shown in FIG. 2, can then be selected by the user. It may be executed so as to be selectable using the mouse 13 or the keyboard 12.

As shown in FIG. 3e, the password editing program checks in step 3140 whether the "OK" button 23 is selected. If so, the password editing program in step 3150 transmits the new password (PASSWORD_1) by means of an appropriate function to a device to process the password on the personal computer 10. Then, in step 3160, the input screen 20 is closed and in step 3170 the password editing program is terminated.

When the password has been transmitted to the password processing device on the personal computer 10, the device processes the new user password. For example, it may check additional password criteria, store the password in the data memory provided, or pass on the password to other system units or other computers in a computer network.

Until all criteria are met, the user does not know whether the password he has entered will be accepted. Only when all criteria are met can input of the identifying characteristic in the input screen 20 be terminated. Then, however, the user can be certain that the password he entered meets the requirements of the system, and input of the password can be terminated.

If manual termination of input of the new password by the user is intended, the present invention avoids failed attempts by activating and deactivating the "OK" button 23 in the input screen 20 as appropriate. The user is only able to terminate his input when a check of the entered password has been successfully performed.

In a further embodiment of the invention, termination of input in the input screen 20 is effected without intervention by the user, as soon as input of the new identifying characteristic is complete and the new identifying characteristic meets all the criteria specified for it. An automated input termination process of this kind, which can be performed by a system component, is beneficial especially in the case of biometric identifying characteristics, for example when scanning fingerprints. If an identifying characteristic has not been correctly entered, the system may—if necessary repeatedly—prompt for repeated input of the identifying characteristic. Failed attempts at input by the user are thus avoided.

Whereas in the previous embodiments of the invention the user is unable to establish during input of the new password the point at which the characters entered by him meet the check criteria, in a further preferred embodiment of the invention, in addition to activation/deactivation of the facility for termination of input in the input screen 20 an error indicator is also activated. This informs the user whether the criteria specified by the application for creation and editing of passwords are met. Error indicators may be: traffic light displays, flag displays, defined signal displays, acoustic warning signals, color indicators (LED, segment displays, etc.), and the like. In the case of termination of input of the identifying characteristic without intervention by the user, an error indicator of this kind may also be provided as an alternative to the facility for terminating input of the identifying characteristic.

In order to prevent misuse of the process, in particular discovery of current valid criteria for the passwords, in a further embodiment of the invention known methods may be applied during input of the new password to check by how much an entered password deviates from the specified criteria. This check can be made in the course of checking the criteria. If a defined degree of deviation is exceeded, input of the password is aborted. The permitted degree of deviation is dependent on the respective application, and so can be selected at will. Although a second input of the password has always previously been assumed, the invention is not restricted thereto. In a further embodiment of the invention, the input screen 20 contains only one input box for input of the new password. No provision is made for repetition of the new password.

In a further embodiment of the invention still, provision is made for multiple input of the password, for example three or four times. Then, as in the case of double input of the password, preference is given to a criterion during checking of the match of the entered passwords.

The invention is not restricted to a specific method of input of the identifying characteristic. Input of the identifying characteristics may, as in the above-cited examples, be effected by means of a keyboard. Identifying characteristics may, however, also be delivered in other ways, for example by transmission of a spoken word, such as via a microphone; by scanning of a pupil, such as by means of an optical scanning device; by reading of a fingerprint, such as by means of optoelectronic reader units and the like.

What is claimed is:

1. A method of administering identifying characteristics in a computer, comprising the steps of:
   - inputting an identifying characteristic from a user;
   - checking the identifying characteristic as it is being inputted and without user intervention for conformance with one or more check criteria;
   - upon inputting of an identifying characteristic meeting the check criteria, enabling a selection facility for subsequent actuation by the user to transmit the identifying characteristic to an identifying characteristic processing device, the selection facility remaining disabled until the inputted identifying characteristic meets the check criteria; and
   - transmitting the identifying characteristic to the identifying characteristic processing device upon enablement of the selection facility and subsequent actuation of the selection facility by the user to transmit the identifying characteristic to the device.

2. The method of claim 1, further comprising the step of:
   - notifying the user during input as to whether the selection facility has been enabled.

3. The method of claim 1 in which, if the identifying characteristic comprises several components, the check is performed for each component individually.

4. The method of claim 1 in which, during the check, the deviation of the identifying characteristic from the check criteria is established, and the input operation is aborted if a specific degree of deviation is exceeded.

5. The method of claim 1 in which the identifying characteristic is a password and one of the check criteria is a matching of a first entry of the password with a second entry of the password.

6. A program storage device readable by a machine, tangibly embodying a program of instructions executable by the machine to perform the method steps of claim 1.

7. A device for administering identifying characteristics in a computer, comprising:
   - means for inputting an identifying characteristic from a user;
   - a check device for checking the identifying characteristic as it is being inputted and without user intervention for conformance with one or more check criteria;

a selection facility for actuation by the user when enabled to transmit the identifying characteristic to an identifying characteristic processing device;

means responsive to inputting of an identifying characteristic meeting the check criteria for enabling the selection facility for subsequent actuation by the user, the selection facility remaining disabled until the inputted identifying characteristic meets the check criteria; and means responsive to enablement of the selection facility and subsequent actuation of the selection facility by the user for transmitting the identifying characteristic to the identifying characteristic processing device.

8. The device of claim 7, comprising means for informing the user during input as to whether the selection facility has been enabled.

9. The device of claim 7, comprising means for checking each component individually if the identifying characteristic comprises several components.

10. The device of claim 7, comprising:

means for establishing a deviation of the identifying characteristic from the check criteria; and means for aborting the input operation if a specific degree of deviation is exceeded.

* * * * *